US008265088B2

(12) United States Patent
Belling et al.

(10) Patent No.: US 8,265,088 B2
(45) Date of Patent: Sep. 11, 2012

(54) METHOD AND APPARATUS FOR A FAST INSTALLATION OF AN IP USER CONNECTION OVER A 3GPP NB INTERFACE UNDER APPLICATION OF THE BICC "DELAYED BACKWARD BEARER ESTABLISHMENT" AND AVOIDANCE OF FAILURE

(75) Inventors: Thomas Belling, Erding (DE); Andrej Görbing, Berlin (DE); Ralf Kochanowski, München (DE); Norbert Seitter, Kempten (DE); Marcelo Nelson Wadeck, Curitiba (BR)

(73) Assignee: Siemens Aktiengesellschaft, Munich (DE)

( * ) Notice: Subject to any disclaimer, the term of this patent is extended or adjusted under 35 U.S.C. 154(b) by 275 days.

(21) Appl. No.: 11/990,637

(22) PCT Filed: Aug. 9, 2006

(86) PCT No.: PCT/EP2006/065185
§ 371 (c)(1),
(2), (4) Date: Feb. 19, 2008

(87) PCT Pub. No.: WO2007/020216
PCT Pub. Date: Feb. 22, 2007

(65) Prior Publication Data
US 2009/0279555 A1 Nov. 12, 2009

(30) Foreign Application Priority Data

Aug. 18, 2005 (EP) ...................................... 05017998

(51) Int. Cl.
*H04L 12/56* (2006.01)
(52) U.S. Cl. ....................................................... 370/401
(58) Field of Classification Search .................. 370/351, 370/352, 356, 395.5, 400, 401, 410, 457
See application file for complete search history.

(56) References Cited

U.S. PATENT DOCUMENTS 6,230,005 B1   5/2001   Le et al.
(Continued)

FOREIGN PATENT DOCUMENTS

RU            2 232 466           7/2004
(Continued)

OTHER PUBLICATIONS

"Universal Mobile Telecommunications System (UMTS); Bearer-independent circuit-switched core network; Stage 2 (3GPP TS 23.205 version 6.1.0 Release 6); ETSI TS 123 205", ETSI Standards, European Telecommunications Standards Institute, Sophia-Antipo, FR, vol. 3-CN4, No. V610, Mar. 2005, XP014027523.

(Continued)

*Primary Examiner* — Hassan Phillips
*Assistant Examiner* — Saba Tsegaye
(74) *Attorney, Agent, or Firm* — Staas & Halsey LLP

(57) ABSTRACT

An IP user data transport connection is established between a Media Gateway O and a Media Gateway T according to the BICC "Delayed Backward Bearer Establishment". The Media Gateway O sends an IPBCP Accepted message towards the Media Gateway T upon receipt of an IPBCP Request message from Media Gateway T. The Media Gateway O sends data within the user data transport connection towards the Media Gateway T. The user data may arrive at the Media Gateway T before the IPBCP accepted message. The Media Gateway T retrieves the source IP address and Port number from a user data transport connection IP packet received the Media Gateway O, and sends the first user data transport connection IP packet(s) towards the Media Gateway O upon receipt of a user data transport connection IP packet from the Media Gateway O, using the retrieved IP Address and Port number as destination.

20 Claims, 1 Drawing Sheet

U.S. PATENT DOCUMENTS

| | | | |
|---|---|---|---|
| 6,765,912 B1* | 7/2004 | Vuong | 370/395.2 |
| 6,826,176 B1 | 11/2004 | Siddiqui et al. | |
| 2005/0047438 A1* | 3/2005 | Sylvain | 370/466 |
| 2006/0251050 A1* | 11/2006 | Karlsson | 370/352 |

FOREIGN PATENT DOCUMENTS

| | | |
|---|---|---|
| WO | 02/41540 | 5/2002 |
| WO | 03/101046 | 12/2003 |

OTHER PUBLICATIONS

International Search Report, mailed Oct. 30, 2006 and issued in corresponding International Patent Application No. PCT/EP2006/065185.

Russian Office Action received Jan. 24, 2011 in respect to corresponding application No. 2008110172/09(010987).

* cited by examiner

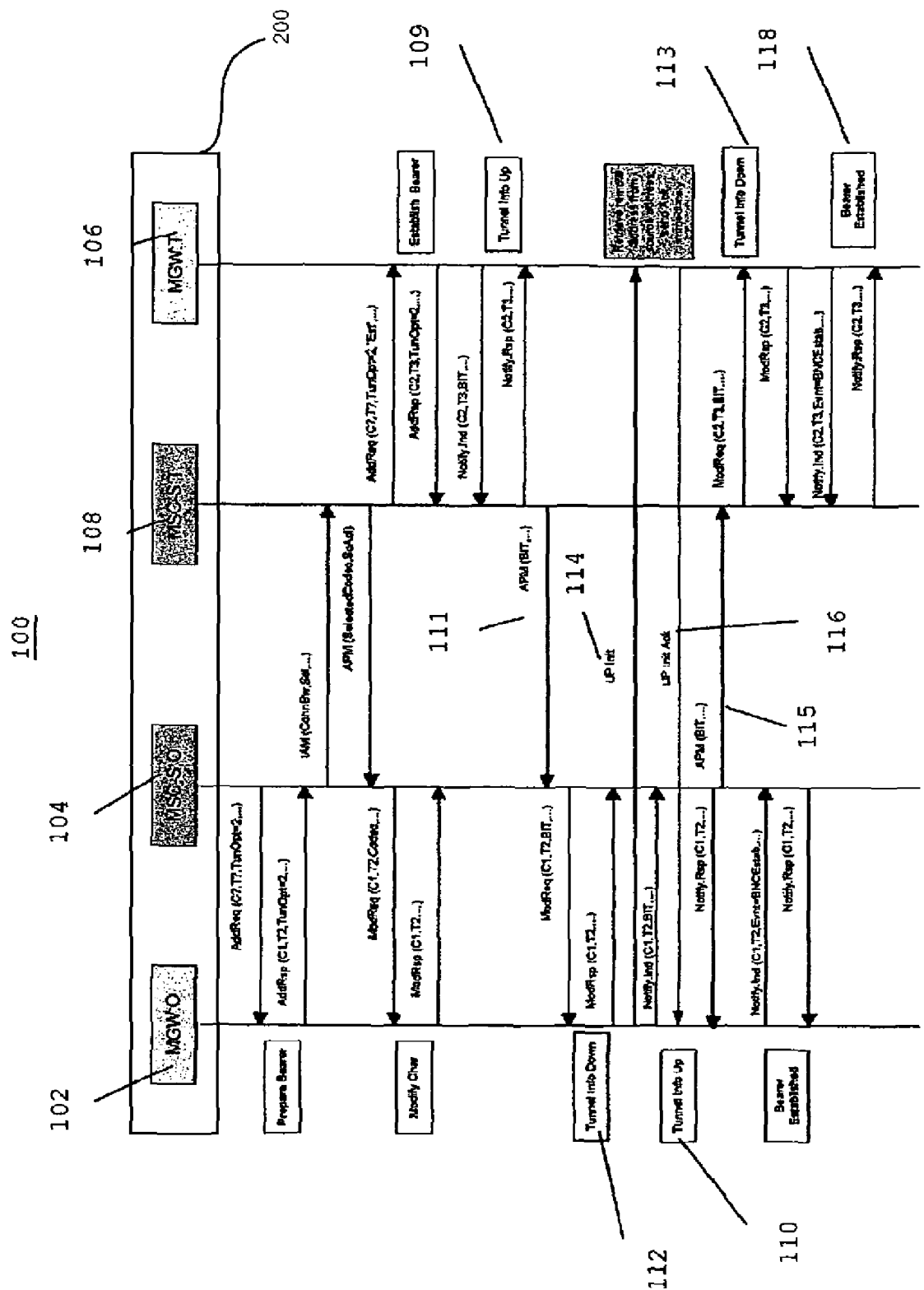

METHOD AND APPARATUS FOR A FAST INSTALLATION OF AN IP USER CONNECTION OVER A 3GPP NB INTERFACE UNDER APPLICATION OF THE BICC "DELAYED BACKWARD BEARER ESTABLISHMENT" AND AVOIDANCE OF FAILURE

CROSS-REFERENCE TO RELATED APPLICATION

This application claims priority to PCT Application No. PCT/EP2006/065185 filed on Aug. 9, 2006 and European Application EP 05017998.5 filed Aug. 18, 2005, the entire disclosures of which are incorporated herein by reference.

BACKGROUND

Method and Apparatus for a Fast Installation of an IP User Connection over a 3GPP Nb Interface under Application of the BICC "Delayed Backward Bearer Establishment" and Avoidance of Failure.

The "Nb Framing Protocol", standardized in 3GPP TS 29.415, is used for the transport of user data in the "Cs Domain" of a 3GPP mobile network. The Nb framing protocol also features inband signaling messages, for instance an Initialization message and an Initialization Acknowledge message. The inband signaling messages need to be exchanged prior to any user data. The ITU-T standardized "Bearer Independent Call Control" (BICC) Protocol, ITU-T Q.1902.5, is used for the so-called Call Control Signaling, as described in 3GPP TS 23.205.

In the case of the use of the IP Protocol for the transport of the User data over the "Nb" interface in the core network of the Cs Domain, the IP addresses and UDP port numbers used to send and receive transport connections at "Media Gateways" (MGW) or integrated "Mobile Services Switching Centers" (MSC) are negotiated with the help of "IP Bearer Control Protocol" (IPBCP), ITU-T Q.1970, as specified in 3GPP TS 29.414. The MGW and integrated MSC connect the function of the MGW and "MSC server" in one device.

The BICC protocol provides different methods for the setting up of IP transport connections, among them the so called "Delayed the Backward Bearer establishment", that is the delayed backwards-directed establishment of the transport connection. In this case, with respect to the initialization of the Nb Framing Protocol, the following problems are still unresolved.

An MGW O sends towards the next MGW T in the direction of the callee, that is called party, an IBCP Accepted message with the IP address and the UDP port number, which the MGW O selected for sending and receiving the user connection. The MGW O simultaneously or soon afterwards sends an initialization message of the Nb Framing Protocol towards MGW T. It is necessary that the MGW T answers the Nb Framing Protocol initialization message immediately with an initialization answer message to the MGW O, in order to achieve a fast establishment of the user connection in order to prevent that the MGW O regards the lack of the answer message during a certain period, as an error case. In accordance with the existing standard, MGW T must send the initialization answer message to the IP address and UDP port number of the MGW O indicated in the IPBCP Accepted message.

The MGW O sends the initialization message of the Nb Framing Protocol directly by means of IP towards the MGW T. On the other hand, the MSC-O sends the IPBCP Accepted message to the MSC Server 0, controlling it. Next, the MSC Server 0 forwards the IPBCP message by means of the BICC call control signaling to the MSC server T controlling MGW T, which passes the message on to MGW T. Therefore, it is likely in this scenario that the initialization message of the Nb Framing Protocol MGW T reaches its destination distinctly before the IPBCP Accepted message.

Problematically, the behavior of the MGW T in this situation is not heretofore recognized in the standard. As a result, the MGW T could ignore the still unexpected initialization message of the Nb Framing Protocol and/or assume an error case and break off the connection establishment. The MGW T might also continue to wait for the IPBCP Accepted message, that is before sending the initialization answer message, which can lead to delays of the installation of the transport connection and errors in the MGW O.

SUMMARY

The inventors have studied a procedure that allows the MGW T in the case of the "Delayed Backward Bearer Establishment" scenario described above, to send the initialization answer message of the Nb Framing Protocol towards MGW O immediately to avoid errors and/or delays during the establishment of the transport connection.

So far the foregoing problem is not recognized and there is no accepted solution of the foregoing problems.

The typical scenario for the solution proposed by the inventors is as follows:

IP in CN, BICC Delayed Backward Call Establishment;

UP initialization is started by initiating MGW as soon as local and remote address information is available; but at the same moment local address information is sent to peer MGW=>Message racing between UP Init on the one hand and IPBCP Accepted message within Notify. Ind (Tunnel Info Up)→APM→Mod.Req (Tunnel Info Down) on the other hand;

High probability that "UP Init" will arrive earlier and will be dropped since remote address is unknown within receiving MGW;

After timeout (500 msec) "UP Init" will be re-tried by initiating MGW, probably with success.

The solution provided here is to acknowledge the "UP Init" immediately after receipt at the MGW by using peer IP address/UDP port within the source address field of the "UP Init". This is described briefly here as follows:

Recognize the special situation within receiving MGW: prepare receive of "UP Init" during Add.Req processing;

Receive the UP Init; retrieve remote address from source field of IP and UDP headers of the "UP Init"; -retrieve RTP payload type number from RTP header of the UP Init;

Send "UP InitAck" immediately using retrieved remote address, port and RTP payload type number;

Send Notify. Ind (Bearer Established) as soon as the remote address is received from MSC-S via IPBCP Accepted.

Amongst the advantages of the proposed solution is that the UP Init message loss, timeout and repeated UP Init are prevented. Further the call establishment delay caused by timeout is prevented.

The above-described embodiments of the present invention are intended as examples, and all embodiments of the present invention are not limited to including the features described above.

BRIEF DESCRIPTION OF THE DRAWINGS

The FIGURE shows the message flow according to one potential embodiment of the invention.

DETAILED DESCRIPTION OF THE PREFERRED EMBODIMENTS

Reference may now be made in detail to embodiments of the present invention, examples of which are illustrated in the accompanying drawings, wherein like reference numerals refer to like elements throughout.

In accordance with the method and apparatus proposed by the inventors, the MGW T employs as the destination address and Port number for the initialization answer message of the Nb Framing Protocol, the "SOURCE" (senders) address and Port number indicated in the received IP packet transporting the initialization message of the Nb Framing Protocol.

This is in contrast with the written standards that mandate employing the IP address and Port number indicated in the IPBCP Accepted message sent from MGW O to MGW T. However, in accordance with IPBCP it is guaranteed that these addresses and Port numbers are identical, since IPBCP directs that the indicated IP address and Port number must be used when sending as well as receiving the IP Packets of the transport connection. Thus IPBCP deviates from the understanding of the IETF that IP addresses and port numbers conveyed within the "Session Description Protocol" (SDP, IETF RFC 2327) only refer to the destination but not to the source of media stream, even though IPBCP employs SDP.

Now with respect to the FIGURE, there is shown the information flow 100 controlled by a processor 200 for the establishment of the IP transport user connection by means of BICC "Delayed Backward Bearer Establishment" according to the proposed solution between a Media gateway MGW O 102 and the controlling MSC server MSC-S O 104 as well as a Media gateway MGW T 106 and the controlling MSC server MSC-S T 108.

Here, the MGW O 102 is shown positioned before the MGW T 106 in the transport connection as seen from the calling side.

The IPBCP Protocol is transported between the MGW and server by means of "Tunnel Info UP" (109, 110) and "Tunnel Info Down" (112, 113) messages and between MSC servers by means of a "APM" messages of the BICC signaling (111, 115).

According to the "Delayed Backward Bearer Establishment", the MGW T 106 first sends an IPBCP Request message (109, 111, 112) to the MGW O 102, and indicates the IP address and UDP Port number within, which MGW T will use for sending and receiving IP packages of the new IP transport connection.

With receipt of this IPBCP Request message MGW O 102 sends an IPBCP Accepted message (110, 115, 113) and at the same time or soon afterwards an initialization message "UP Init" 114 of the Nb Framing Protocol towards MGWT 106. Since "UP Init" is sent directly by means of IP to MGW T 106, while the IPBCP message is passed on by MSC-S T 108 and MSC S O 104, it is probable that "UP Init" message 114 reaches the MGW-T 106 first.

According to the proposed method, the MGW T sends the first packet within the user data connection towards MGW O, i.e. the initialization answer message "UP InitAck" 116 of the Nb Framing Protocol, directly after receipt of the first packet within the user data connection from MGW O, i.e. the "UP Init" message 114, and uses as the IP destination address and Port Number the address and Port Number indicated in the IP header of the "UP Init" message 114 as source address and Port number.

As RTP payload type number in the "UP InitAck" message 116, the MGWT 106 employs the RTP payload type used in the RTP header of the received "UP Init" message 114.

The MGW T 106 according to the proposed method here sends the initialization answer message immediately after, or soon after, receipt of the Initialization message not, as before in the Standard, just after receipt of the IPBCP Accepted message.

To continue, the Nb Framing Protocol is transported in the payload of the "Real-Time Transport Protocols" (RTP), IETF RFC 2833. The RTP header of each packet contains a so-called RTP Payload-Type to indicate the payload type. For the Nb Framing Protocol as payload within RTP, a so-called dynamic RTP payload type number is used, i.e., a number which is assigned to the payload type by a negotiation prior to the establishment of the RTP transport connection. IPBCP is used for this negotiation.

Accordingly, the MGW T 106 uses the same RTP Payload-Type number for the Nb Framing Protocol initialization answer message, which was used in the RTP header of the packet transporting the Nb Framing Protocol initialization message. According to the existing standard, MGW T 106 would use the RTP Payload-Type number received within the IPBCP message instead. However, since MGW O 102 uses the RTP payload type number that is indicated in the IPBCP message towards MGW T 106 for the Iu FP initialization message, and since MGW T 106 must indicate the same RTP pay load type number in the IPBCP answer message to MGW O 102, which it received in the IPBCP message from MGW O 102 in accordance with IPBCP, it is guaranteed that the changed behavior of MGW T 106 causes no error at MGW O 102.

According to the existing standard, the MGW T 106 needs to notify MSC-S T 108 using the Bearer Established Procedure 118 once the user data transport connection has been established by the Nb framing protocol initialization. However, MSC-S T 108 will expect this notification only after sending the Tunnel Info Down Procedure 113. It is therefore advantageous if MGW T 106 sends the Bearer Established Procedure 118 only after receiving the Tunnel Info Down Procedure 113.

It shall be appreciated that, with the methodology proposed here, error and delays are avoided in the case of a BICC "Delayed Backward Bearer establishment" during the installation of IP transport connections through the Cs Domain of the 3GPP Mobile network.

The methodology proposed here is also applicable if other framing protocols are used to transport user data instead of the Nb framing protocol, for instance if the user data are directly transported within the "Real-Time Transport Protocols" (RTP), IETF RFC 2833. It is essential that MGW T sends the first packet within the user data transport connection towards MGW O after receipt of the first packet within the user data transport connection from MGW O and that MGW T uses as the IP destination address and Port Number of the sent packet the address and Port Number indicated in the IP header of the received packet from MGW T as source address and Port number. Here, the particular advantage of the proposed methodology is a speed-up of the establishment of the user data transport connection.

The invention has been described in detail with particular reference to preferred embodiments thereof and examples, but it will be understood that variations and modifications can be effected within the spirit and scope of the invention covered by the claims which may include the phrase "at least one of A, B and C" as an alternative expression that means one or more of A, B and C may be used, contrary to the holding in Superguide v. DIRECTV, 69 USPQ2d 1865 (Fed. Cir. 2004).

The invention claimed is:

1. A method for establishing an IP transport user connection, the method comprising:
    employing a Bearer Independent Call Control "Delayed Backward Bearer Establishment" between a network entity Media Gateway O and a network entity Media Gateway T within an IP network;
    sending an IP Bearer Control Protocol Accepted message from the Media Gateway O towards the Media Gateway T;
    sending packet(s) within a user data transport connection towards the Media Gateway T:
    retrieving a source IP address and Port number by the Media Gateway T from a user data transport connection IP packet received from the Media Gateway O,
    sending by the Media Gateway T upon receipt of the user data transport connection IP packet from the Media Gateway O a first user data transport connection IP packet(s) towards the Media Gateway O; and
    using the retrieved IP Address and Port number as a destination.

2. The method of claim 1, further comprising:
    receiving the first user data transport connection IP packet from the Media Gateway O; and
    sending by the Media Gateway T the first user data transport connection IP packet towards the Media Gateway O immediately.

3. The method of claim 2, further comprising transporting the user data within the "Real Time Transport Protocol", IETF RFC 2833 or RFC 1889.

4. The method of claim 3, further comprising retrieving the RTP payload type number from the RTP header of the user data transport connection IP packet received from the Media Gateway O by the Media Gateway T.

5. The method of claim 4, further comprising using the retrieved RTP payload type number from the RTP header of the user data transport connection IP packet received from the Media Gateway O by the Media Gateway T as an RTP payload type number within the user data transport connection packages sent towards the Media Gateway O.

6. The method of claim 5, further comprising transporting the user data within the "Nb framing protocol", 3GPP TS 29.415.

7. The method of claim 6, further comprising using T the "Nb Init" message as the user data transport connection IP packet by the Media Gateway to retrieve data from the Media Gateway O.

8. The method of claim 7, further comprising using the "Nb Init Ack" message as the first user data transport connection IP packet sent towards the Media Gateway O by the Media Gateway T.

9. The method of claim 8, further comprising sending the "Bearer Established" Notify indication 118 by the Media Gateway T after receipt of the "Tunnel Info Down" procedure 113.

10. The method of claim 9, further comprising using the Nb interface of the Cs Domain of a 3GPP mobile network by the Media Gateway T to transport the user data transport connection.

11. The method of claim 1, further comprising transporting the user data within the "Real Time Transport Protocol", IETF RFC 2833 or RFC 1889.

12. The method of claim 1, further comprising retrieving an RTP payload type number from an RTP header of the user data transport connection IP packet received from the Media Gateway O by the Media Gateway T.

13. The method of claim 1, further comprising using a retrieved RTP payload type number from an RTP header of the user data transport connection IP packet received from the Media Gateway O by the Media Gateway T as the RTP payload type number within the user data transport connection packages sent towards the Media Gateway O.

14. The method of claim 1, further comprising transporting user data within the "Nb framing protocol", 3GPP TS 29.415.

15. The method of claim 1, further comprising using T the "Nb Init" message as the user data transport connection IP packet by the Media Gateway to retrieve data from the Media Gateway O.

16. The method of claim 1, further comprising using the "Nb Init Ack" message as the first user data transport connection IP packet sent towards the Media Gateway O by the Media Gateway T.

17. The method of claim 1, further comprising sending the "Bearer Established" Notify indication 118 by the Media Gateway T after receipt of the "Tunnel Info Down" procedure 113.

18. The method of claim 1, further comprising using the Nb interface of the Cs Domain of a 3GPP mobile network by the Media Gateway T to transport the user data transport connection.

19. An apparatus that establishes an IP user data transport connection by means of a processor, wherein
    a Bearer Independent Call Control "Delayed Backward Bearer Establishment" is controlled by the processor and employed between a network entity Media Gateway O and a network entity Media Gateway T within an IP network,
    an IP Bearer Control Protocol Accepted message is sent from the Media Gateway O towards the Media Gateway T controlled by the processor,
    packet(s) are sent within a user data transport connection controlled by the processor towards the Media Gateway T,
    a source IP address and Port number are retrieved by the Media Gateway T from a user data transport connection IP packet received from the Media Gateway O controlled by the processor,
    first user data transport connection IP packet(s) are sent towards the Media Gateway O by the Media Gateway T upon receipt of the user data transport connection IP packet from the Media Gateway O controlled by the processor; and
    the retrieved IP Address and Port number are used as a destination.

20. The apparatus of claim 19, wherein the apparatus is a "Media Gateway" or an integrated "Mobile Services Switching Center".

* * * * *